(12) United States Patent
Dong et al.

(10) Patent No.: US 11,412,474 B2
(45) Date of Patent: Aug. 9, 2022

(54) POSITIONING METHOD AND APPARATUS

(71) Applicant: HUAWEI TECHNOLOGIES CO., LTD., Guangdong (CN)

(72) Inventors: Wei Dong, Xi'an (CN); Hua Fan, Shenzhen (CN); Xiaojie Li, Shenzhen (CN); Fei Jiao, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 127 days.

(21) Appl. No.: 17/014,098

(22) Filed: Sep. 8, 2020

(65) Prior Publication Data

US 2020/0404614 A1 Dec. 24, 2020

Related U.S. Application Data

(63) Continuation of application No. PCT/CN2019/077184, filed on Mar. 6, 2019.

(30) Foreign Application Priority Data

Mar. 9, 2018 (CN) .......................... 201810194987.3

(51) Int. Cl.
*H04W 64/00* (2009.01)
*H04W 88/08* (2009.01)
(Continued)

(52) U.S. Cl.
CPC ........ *H04W 64/003* (2013.01); *H04B 17/336* (2015.01); *H04W 24/10* (2013.01); *H04W 88/085* (2013.01)

(58) Field of Classification Search
CPC ........ G01S 1/68; G01S 5/0027; G01S 5/0036; G01S 5/0081; G01S 5/0242; G01S 5/14;
(Continued)

(56) References Cited

U.S. PATENT DOCUMENTS

| 6,901,264 | B2 | 5/2005 | Myr | |
|---|---|---|---|---|
| 10,524,132 | B2 * | 12/2019 | Tang | ...................... H04W 52/34 |

(Continued)

FOREIGN PATENT DOCUMENTS

| CN | 1423134 A | 6/2003 |
|---|---|---|
| CN | 102083197 A | 6/2011 |

(Continued)

*Primary Examiner* — Liton Miah
(74) *Attorney, Agent, or Firm* — Womble Bond Dickinson (US) LLP

(57) ABSTRACT

A positioning method includes: sending, by a base station, indication information to a plurality of UEs, where the plurality of UEs have an MDT function in a cell covered by a to-be-positioned RRU, and the indication information is used to indicate the plurality of UEs to periodically report location information; obtaining, by the base station within each of at least one time period, time-of-arrival ToA measurement values of N UEs, where the N UEs are some UEs that report the location information in the plurality of UEs, N≥1, and N is an integer; and calculating, by the base station, a location of the to-be-positioned RRU based on M ToA measurement values obtained within the at least one time period and M pieces of location information that are in the received location information and that respectively correspond to the M ToA measurement values, where M≥3, and M is an integer.

15 Claims, 10 Drawing Sheets

(51) Int. Cl.
*H04W 24/10* (2009.01)
*H04B 17/336* (2015.01)

(58) Field of Classification Search
CPC .. H04B 17/336; H04W 24/10; H04W 64/003; H04W 88/085; H04W 24/08; H04W 64/006
See application file for complete search history.

(56) References Cited

U.S. PATENT DOCUMENTS

| | | | |
|---|---|---|---|
| 10,716,104 B2* | 7/2020 | Huang | H04W 72/042 |
| 2007/0042706 A1 | 2/2007 | Ledeczi et al. | |
| 2013/0343332 A1 | 12/2013 | Yao | |
| 2014/0044002 A1 | 2/2014 | Fujishiro | |
| 2015/0208197 A1* | 7/2015 | Keskitalo | H04W 4/02 455/456.1 |
| 2017/0059717 A1 | 3/2017 | Polehn et al. | |
| 2017/0215099 A1* | 7/2017 | Han | H04W 24/10 |
| 2018/0206144 A1* | 7/2018 | Jiang | H04W 4/33 |
| 2019/0116506 A1* | 4/2019 | Bendlin | H04B 17/318 |
| 2019/0380017 A1* | 12/2019 | Thangarasa | H04W 4/70 |

FOREIGN PATENT DOCUMENTS

| | | |
|---|---|---|
| CN | 102256350 A | 11/2011 |
| CN | 101389118 B | 6/2012 |
| CN | 103259607 A | 8/2013 |
| CN | 105007623 A | 10/2015 |
| CN | 105472730 A | 4/2016 |
| CN | 106792503 A | 5/2017 |
| CN | 106851550 A | 6/2017 |
| EP | 3337195 A1 | 6/2018 |

* cited by examiner

POSITIONING METHOD AND APPARATUS

CROSS-REFERENCE TO RELATED APPLICATIONS

This application is a continuation of International Patent Application No. PCT/CN2019/077184, filed on Mar. 6, 2019, which claims priority to Chinese Patent Application No. 201810194987.3, filed on Mar. 9, 2018. The disclosures of the aforementioned applications are hereby incorporated by reference in their entireties.

TECHNICAL FIELD

This application relates to the field of communications technologies, and in particular, to a positioning method and an apparatus.

BACKGROUND

In a wireless communications network, to maintain a site, longitude and latitude of the site usually need to be recorded. For a traditional macro base station, a remote radio unit (RRU) is deployed very close to a baseband processing unit (BBU), and a global positioning system (GPS) apparatus is deployed on the BBU to record longitude and latitude information and automatically upload the longitude and latitude information to a network management system. Therefore, for the traditional macro base station, location information of the site mainly reflects the longitude and latitude of the BBU. For a distributed base station where an RRU is far away from a BBU (currently, a maximum distance between the RRU and the BBU is 20 km) or a plurality of RRUs belong to one cell, the longitude and the latitude of the BBU cannot well reflect an actual location of the RRU.

To more accurately determine the location of the RRU through positioning, a method currently used is to add a built-in positioning module in the RRU, so that the BBU may obtain location information of the RRU by reading a positioning result of the positioning module, and report the location information to the network management system. However, the method of adding the built-in positioning module has a great impact on a hardware layout of the RRU, increases costs sharply, and cannot be applied to a large quantity of existing RRUs on a live network.

SUMMARY

This application provides a positioning method and an apparatus, to position an RRU without increasing costs.

According to a first aspect, this application provides a positioning method, including: sending, by a base station, indication information to a plurality of user equipment (UE), where the plurality of UEs are UEs that have a minimization of drive-test (MDT) function in a cell covered by a to-be-positioned RRU, and the indication information is used to indicate the plurality of UEs to periodically report location information; obtaining, by the base station within each of at least one time period, time-of-arrival (ToA) measurement values of N UEs, where the N UEs are some UEs that report the location information in the plurality of UEs, N≥1, and N is an integer; and calculating, by the base station, a location of the to-be-positioned RRU based on M ToA measurement values obtained within the at least one time period and M pieces of location information that are in the received location information and that respectively correspond to the M ToA measurement values, where M≥3, and M is an integer.

Based on the positioning method provided in this application, the base station indicates, by using the indication information, the UEs to periodically report the location information, and obtains the M ToA measurement values by performing ToA measurement on the UEs, so that location information of the to-be-positioned RRU is obtained through calculation based on the M ToA measurement values and location information corresponding to each ToA measurement value. By using the method of determining the location of the RRU through positioning by using the location information of the UEs and the ToA measurement value, a positioning module does not need to be added to the to-be-positioned RRU, and a hardware layout of the to-be-positioned RRU does not need to be changed, thereby avoiding increasing costs of the to-be-positioned RRU, and implementing positioning a large quantity of to-be-positioned RRUs on a live network.

In addition, regardless of a time division duplex (TDD) system or a frequency division duplex (FDD) system, the base station may enable the MDT function to indicate the UEs to periodically report the location information and perform ToA measurement on each UE. Therefore, according to the positioning method provided in this application, both an RRU in the TDD system and an RRU in the FDD system can be positioned.

In one embodiment, the N UEs are UEs that meet at least one condition of a condition A and a condition B; the condition A is a signal to interference plus noise ratio (SINR) is greater than or equal to a preset SINR threshold; and the condition B is a Doppler frequency (DF) is less than or equal to a preset DF threshold.

In one embodiment, the UE of which the SINR is greater than or equal to the SINR threshold and/or the UE of which the DF is less than or equal to the DF threshold are/is selected from the UEs that report the location information as UE configured to position the RRU, so that measurement quality of a subsequent ToA measurement value can be improved.

In one embodiment, a method in which the base station obtains a ToA measurement value of each of the N UEs is specifically: measuring, by the base station, ToA of a plurality of uplink signals from the UE in a plurality of consecutive frames, where ToA of each uplink signal is a time period that the uplink signal takes to arrive at the to-be-positioned RRU; calculating, by the base station, an average value of the ToA of the plurality of uplink signals; and adding, by the base station, the average value and a current timing advance TA of the UE, to obtain the ToA measurement value of the UE.

In one embodiment, measurement is performed on multiple frames in an accumulation measurement manner, so that precision of the obtained ToA measurement value can be improved, thereby improving accuracy of the calculated location of the to-be-positioned RRU.

In one embodiment, for each of the M ToA measurement values, location information corresponding to the ToA measurement value is: location information, in the location information reported by the UE of which the ToA measurement value is obtained by the base station by performing ToA measurement, of which reporting time is closest to time at which the base station performs the ToA measurement.

In one embodiment, the ToA measurement value and the location information of which time information is closest to each other are selected as information about one sample point, so that accuracy of the calculated location of the RRU can be improved.

In one embodiment, the method further includes: sending, by the base station, the location of the to-be-positioned RRU to a network device.

According to a second aspect, this application provides a base station, including: a transceiver unit, configured to send indication information to a plurality of UEs, where the plurality of UEs are UEs that have an MDT function in a cell covered by a to-be-positioned radio remote unit RRU, and the indication information is used to indicate the plurality of UEs to periodically report location information; a processing unit, configured to obtain, within each of at least one time period, time-of-arrival ToA measurement values of N UEs, where the N UEs are some UEs that report the location information in the plurality of UEs, N≥1, and N is an integer; and the processing unit, further configured to calculate a location of the to-be-positioned RRU based on M ToA measurement values obtained within the at least one time period and M pieces of location information that are in the location information received by the transceiver unit and that respectively correspond to the M ToA measurement values, where M≥3, and M is an integer.

In one embodiment, the N UEs are UEs that meet at least one condition of a condition A and a condition B; the condition A is a signal to interference plus noise ratio is greater than or equal to a preset SINR threshold; and the condition B is a Doppler frequency is less than or equal to a preset DF threshold.

In one embodiment, a method in which the processing unit obtains a ToA measurement value of each of the N UEs is specifically: measuring ToA of a plurality of uplink signals sent by the UE in a plurality of consecutive frames, where ToA of each uplink signal is a time period that the uplink signal takes to arrive at the to-be-positioned RRU; calculating an average value of the ToA of the plurality of uplink signals; and adding the average value and a current timing advance TA of the UE, to obtain the ToA measurement value of the UE.

In one embodiment, for each of the M ToA measurement values, location information corresponding to the ToA measurement value is: location information, in the location information reported by the UE of which the ToA measurement value is obtained by the processing unit by performing ToA measurement, of which reporting time is closest to time at which the base station performs the ToA measurement.

In one embodiment, the transceiver unit is further configured to send the location of the to-be-positioned RRU to a network device.

For technical effects of the base station provided in this application, refer to technical effects of the foregoing first aspect or embodiments of the first aspect. Details are not described herein again.

According to a third aspect, this application provides a positioning method, including: determining, by a base station to which a to-be-positioned RRU belongs, M assistant positioning RRUs, where the M assistant positioning RRUs are RRUs of which locations are known; indicating, by the base station to which the to-be-positioned RRU belongs, the to-be-positioned RRU to send a positioning sequence to the M assistant positioning RRUs through a coupling channel, so that a base station to which each of the M assistant positioning RRUs belongs performs ToA measurement on the positioning sequence received by the assistant positioning RRU through the coupling channel, to obtain a corresponding ToA measurement value, and calculates a location of the to-be-positioned RRU based on the obtained ToA measurement value and location information of the M assistant positioning RRUs.

According to the positioning method provided in this application, the to-be-positioned RRU may send the positioning sequence to the assistant positioning RRU through the coupling channel, so that the base station to which each assistant positioning RRU belongs can obtain the corresponding ToA measurement value through measurement. Therefore, the network device can calculate the location of the to-be-positioned RRU based on the ToA measurement value sent by the base station to which each assistant positioning RRU belongs and the location information of each assistant positioning RRU. By using the method of determining the location of the to-be-positioned RRU through positioning by using the location information of the assistant positioning RRU and the ToA measurement value, a positioning module does not need to be added to the to-be-positioned RRU, and a hardware layout of the to-be-positioned RRU does not need to be changed, thereby avoiding increasing costs of the to-be-positioned RRU, and implementing positioning a large quantity of to-be-positioned RRUs on a live network.

In one embodiment, the indicating, by the base station to which the to-be-positioned RRU belongs, the to-be-positioned RRU to send a positioning sequence to the M assistant positioning RRUs through a coupling channel includes: indicating, by the base station to which the to-be-positioned RRU belongs within a time period in which a service volume is less than a preset service volume, the to-be-positioned RRU to send the positioning sequence to the M assistant positioning RRUs through the coupling channel.

In one embodiment, the M assistant positioning RRUs are M assistant positioning RRUs of which load is less than a preset threshold.

According to a fourth aspect, this application provides a positioning method, including: performing, by a base station to which assistant positioning RRUs belong, ToA measurement on a positioning sequence received by the assistant positioning RRUs through a coupling channel, to obtain a corresponding ToA measurement value; and sending, by the base station to which the assistant positioning RRUs belong, the ToA measurement value obtained through measurement and location information of the assistant positioning RRUs to a network device, so that the network device calculates a location of a to-be-positioned RRU based on location information of the M assistant positioning RRUs and the corresponding ToA measurement value.

According to the positioning method provided in this application, the to-be-positioned RRU may send the positioning sequence to the assistant positioning RRUs through the coupling channel, so that the base station to which each assistant positioning RRU belongs can obtain the corresponding ToA measurement value through measurement. Therefore, the network device can calculate the location of the to-be-positioned RRU based on the ToA measurement value sent by the base station to which each assistant positioning RRU belongs and the location information of each assistant positioning RRU. By using the method of determining the location of the to-be-positioned RRU through positioning by using the location information of the assistant positioning RRU and the ToA measurement value, a positioning module does not need to be added to the to-be-positioned RRU, and a hardware layout of the to-be-positioned RRU does not need to be changed, thereby avoiding increasing costs of the to-be-positioned RRU, and implementing positioning a large quantity of to-be-positioned RRUs on a live network.

In one embodiment, the performing, by a base station to which assistant positioning RRUs belong, ToA measurement on a positioning sequence received by the assistant positioning RRUs through a coupling channel includes: measuring, by the base station to which the assistant positioning RRUs belong, ToA of a plurality of positioning sequences received by the assistant positioning RRUs in a plurality of consecutive frames, where ToA of each positioning sequence is a time period that the positioning sequence takes to arrive at the assistant positioning RRUs; and calculating, by the base station to which the assistant positioning RRUs belong, an average value of the ToA of the plurality of positioning sequences, where the average value is the obtained corresponding ToA measurement value.

According to a fifth aspect, this application provides a base station, including a processing unit, configured to determine M assistant positioning RRUs, where the M assistant positioning RRUs are RRUs of which locations are known; and a transceiver unit, configured to: indicate a to-be-positioned RRU to send a positioning sequence to the M assistant positioning RRUs through a coupling channel, so that a base station to which each of the M assistant positioning RRUs belongs performs ToA measurement on the positioning sequence received by the assistant positioning RRU through the coupling channel, to obtain a corresponding ToA measurement value, and calculates a location of the to-be-positioned RRU based on the obtained ToA measurement value and location information of the M assistant positioning RRUs.

In one embodiment, that the transceiver unit indicates a to-be-positioned RRU to send a positioning sequence to the M assistant positioning RRUs through a coupling channel specifically includes: indicating, within a time period in which a service volume is less than a preset service volume, the to-be-positioned RRU to send the positioning sequence to the M assistant positioning RRUs through the coupling channel.

In one embodiment, the M assistant positioning RRUs are M assistant positioning RRUs of which load is less than a preset threshold.

For technical effects of the base station provided in this application, refer to technical effects of the foregoing third aspect or embodiments of the third aspect. Details are not described herein again.

According to a sixth aspect, this application provides a base station, including: a processing unit, configured to perform ToA measurement on a positioning sequence received by an assistant positioning RRUs through a coupling channel, to obtain a corresponding ToA measurement value; and a transceiver unit, configured to send the ToA measurement value obtained through measurement and location information of the assistant positioning RRUs to a network device, so that the network device calculates a location of a to-be-positioned RRU based on location information of the M assistant positioning RRUs and the corresponding ToA measurement value.

In one embodiment, that the processing unit performs the ToA measurement on the positioning sequence received by the assistant positioning RRUs through the coupling channel specifically includes: measuring ToA of a plurality of positioning sequences received by the assistant positioning RRUs in a plurality of consecutive frames, where ToA of each positioning sequence is a time period that the positioning sequence takes to arrive at the assistant positioning RRUs; and calculating an average value of the ToA of the plurality of positioning sequences, where the average value is the obtained corresponding ToA measurement value.

For technical effects of the base station provided in this application, refer to technical effects of the foregoing fourth aspect or embodiments of the fourth aspect. Details are not described herein again.

According to a seventh aspect, this application further provides a base station, including: a processor, a memory, a bus, and a transceiver, where the memory is configured to store a computer-executable instruction; and the processor is connected to the memory and the transceiver by using the bus, and when the base station is run, the processor executes the computer-executable instruction stored in the memory, to implement the positioning method performed by the base station to which the to-be-positioned RRU belongs in the first aspect and embodiments of the first aspect or the third aspect and embodiments of the third aspect, and/or the positioning method performed by the base station to which the assistant positioning RRU belongs in the fourth aspect and embodiments of the fourth aspect.

For technical effects of the base station provided in this application, refer to technical effects of the foregoing first aspect, embodiments of the first aspect, third aspect, embodiments of the third aspect, fourth aspect, and embodiments of the fourth aspect. Details are not described herein again.

According to an eighth aspect, this application further provides a computer storage medium, where the computer storage medium stores an instruction, and when the instruction is run on a computer, the computer is enabled to perform the method in the foregoing first aspect, embodiments of the first aspect, third aspect, embodiments of the third aspect, fourth aspect, and embodiments of the fourth aspect.

According to a ninth aspect, this application further provides a computer program product including instructions, and when the instructions are run on a computer, the computer is enabled to perform the positioning method in the first aspect, the third aspect, and/or the fourth aspect.

According to a tenth aspect, this application provides a communications apparatus, including units or means configured to perform operations in the first aspect, the third aspect, and/or the fourth aspect.

In one embodiment, the communications apparatus may be a chip.

DESCRIPTION OF EMBODIMENTS

In the following, the terms "system" and "network" may be used interchangeably in this specification. The term "and/or" in this specification describes only an association relationship for describing associated objects and represents that three relationships may exist. For example, A and B may represent the following three cases: Only A exists, both A and B exist, and only B exists. In addition, the character "/" in this specification generally indicates an "or" relationship between the associated objects.

In addition, the positioning method provided in this application may be applied to an LTE system, long term evolution-advanced (LTE-A), or another wireless communications system using various radio access technologies, for example, code division multiple access, frequency division multiple access, time division multiple access, orthogonal frequency division multiple access, and carrier aggregation (CA). In addition, the positioning method may be alternatively applied to a future evolved system, such as a fifth-generation 5G system.

Figure 1:
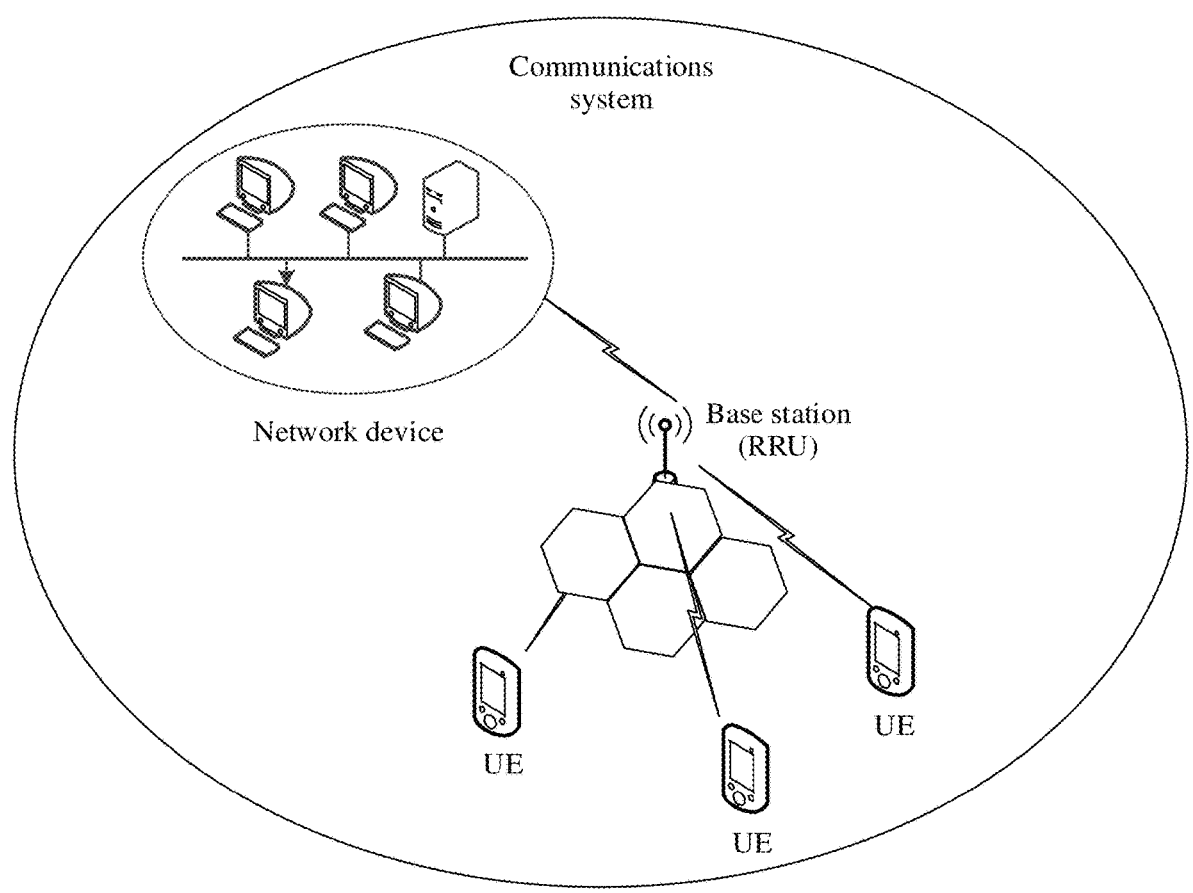
FIG. 1 is a schematic diagram 1 of a communications system according to this application.

For example, FIG. 1 is a communications system according to this application. The communications system includes at least one user equipment UE, a base station, and a network device. The UE has an MDT function. The UE having the MDT function can periodically report location information based on indication information delivered by the base station. The UE in this application may specifically include various handheld devices that have the MDT function, vehicle-mounted devices, wearable devices, computing devices, or another processing device connected to a wireless modem, a communications node on a household appliance, a medical device, an industrial component, an agricultural component, or an aviation device, and user equipment (UE), a mobile station (MS), a terminal, a terminal device (terminal equipment), or the like in various forms. For ease of description, in this application, devices mentioned above are collectively referred to as UE.

The base station in this application may be a base station (BS) device that is deployed in a radio access network and that is configured to provide a wireless communications function for the UE, and includes a macro base station, a micro base station, a relay station, a controller, an access point, and the like in various forms. In systems using different radio access technologies, a device that has a base station function may have different names. For example, in an LTE network, the device is referred to as an evolved NodeB (eNB), or in a third-generation 3G network, the device is referred to as a NodeB, or in a fifth generation communications system, the device is referred to as a communications node. Alternatively, the base station in this application may be another similar network device. In this application, a structure of the base station includes a remote RRU, a BBU, and an antenna feeder system.

The network device is a network management device that needs to obtain a location of an RRU and implement visualization of a physical location of the RRU and refined network coverage and network capacity evaluation based on the location of the RRU. For example, the network device may be a communications device such as U2000, AOS, or WINS.

Figure 2:
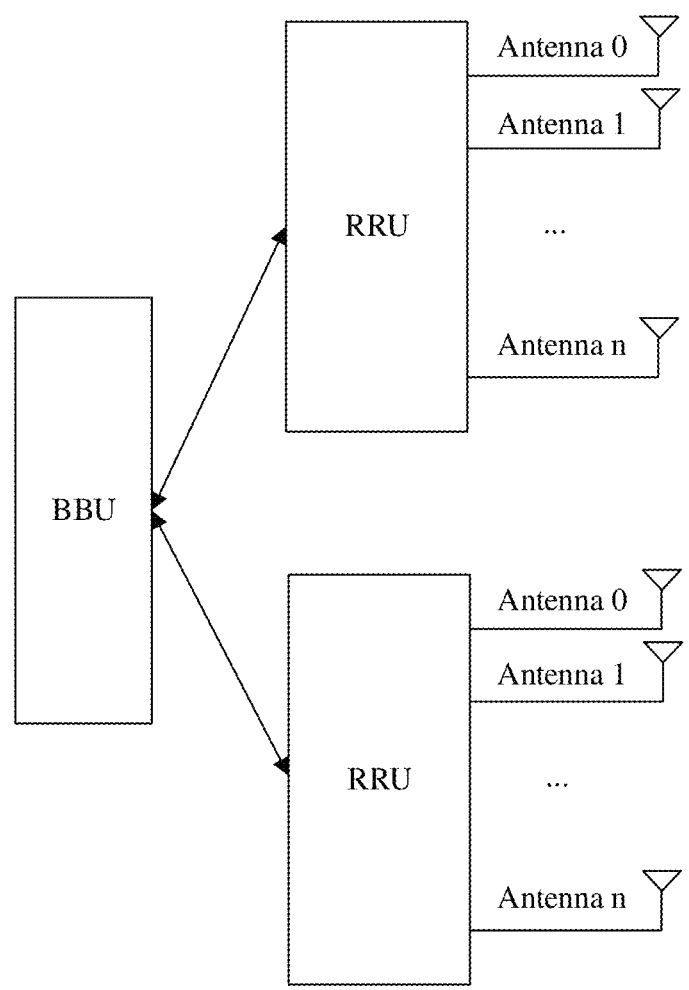
FIG. 2 is a schematic structural diagram 1 of a base station according to this application.

For example, FIG. 2 is a structure of a base station according to this application. One BBU may be connected to at least one RRU, and RRUs may be separately deployed.

The RRU includes a digital intermediate frequency module, a transceiver module, a power amplification module and a filter module. The digital intermediate frequency module is configured to perform modulation and demodulation, digital up-conversion and down-conversion, and analog-to-digital (AD) conversion in optical transmission, and the transceiver module completes conversion from an intermediate frequency signal to a radio frequency signal. Then, the power amplification module and the filter module transmit the radio frequency signal through an antenna port. The BBU is configured to perform functions such as channel coding and decoding, modulation and demodulation of a baseband signal, and protocol processing, provide an interface function for an upper-layer network element, and process a physical layer core technology, for example, code division multiple access (CDMA) in the 3G and an orthogonal frequency division multiplexing (OFDM) technology/multiple-input multiple-output (MIMO) processing in the LTE. The BBU, the RRU, and an antenna are connected to each other through a channel. A coupled circuit is configured to compensate each channel.

In this application, the base station calculates the location of the RRU based on obtained information about M sample points (including location information of UE and a ToA measurement value), without needing to add a positioning module to a to-be-positioned RRU or change a hardware layout of the to-be-positioned RRU. In this way, a large quantity of to-be-positioned RRUs on a live network can be positioned without increasing costs of the to-be-positioned RRUs.

Figure 3:
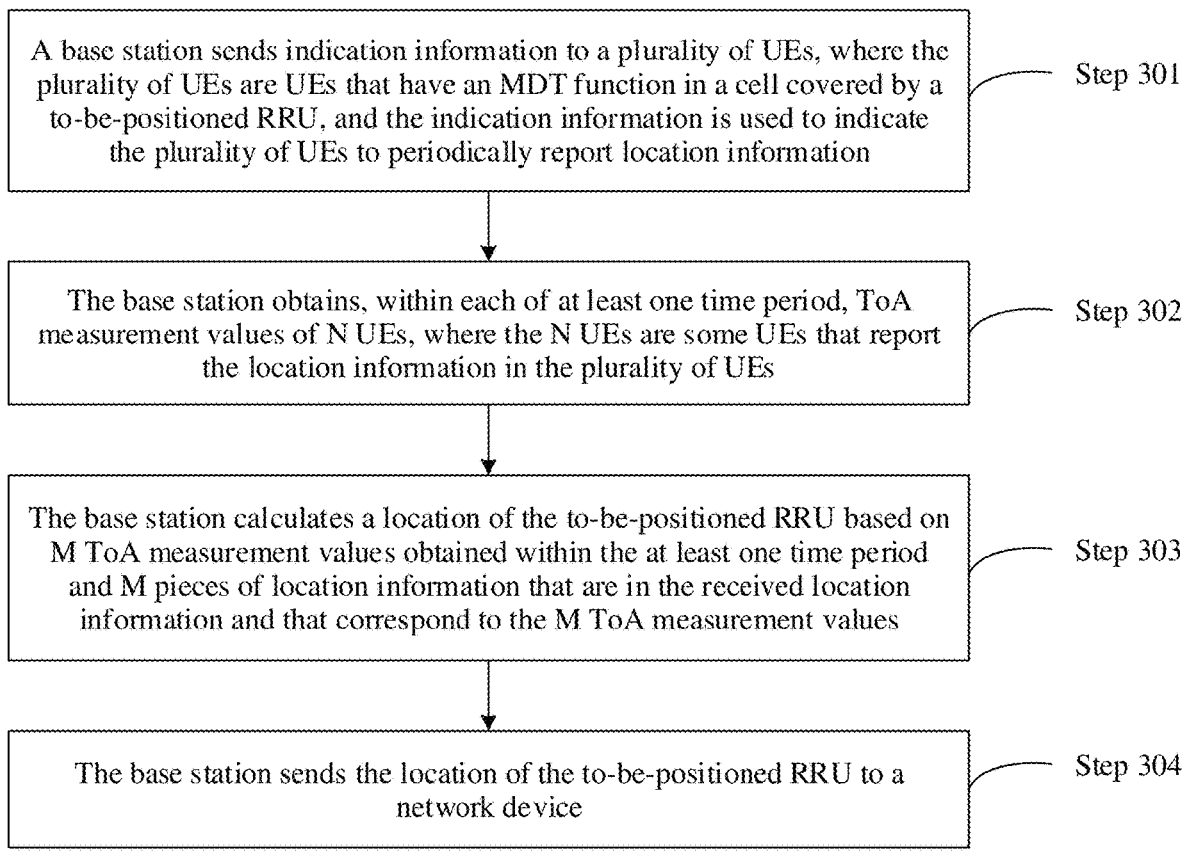
FIG. 3 is a flowchart 1 of an embodiment of a positioning method according to this application.

FIG. 3 is a flowchart of an embodiment of a positioning method according to this application. The method includes the following operations.

Operation 301: A base station sends indication information to a plurality of UEs, where the plurality of UEs are UEs that have an MDT function in a cell covered by a to-be-positioned RRU, and the indication information is used to indicate the plurality of UEs to periodically report location information.

The base station is a base station to which the to-be-positioned RRU belongs. When the RRU needs to be positioned, the base station enables the MDT function (that is, a function of sending the indication information and receiving the location information periodically from the UEs based on the indication information), to send, through the to-be-positioned RRU, the indication information to the UEs in the cell covered by the to-be-positioned RRU.

In this application, the base station may send the indication information to all UEs in the cell covered by the to-be-positioned RRU, or may randomly select a preset quantity of UEs and send the indication information.

The UE that receives the indication information may periodically report the location information of the UE in a case in which the UE can obtain and report the location information of the UE. The UE may periodically measure and report the location information of the UE via a global positioning system (global positioning system, GPS) or another positioning manner.

In an example, the location information may include longitude and latitude of the UE and information about time at which the longitude and latitude are measured each time.

Operation 302: The base station obtains, within each of at least one time period, ToA measurement values of M UEs, where the M UEs are some UEs that report the location information in the plurality of UEs, N≥1, and N is an integer.

After delivering the indication information, the base station may perform ToA measurement on the plurality of UEs, to obtain M (M≥3, and M is an integer) ToA measurement values.

In this application, the base station may preset at least one time period to perform the ToA measurement. In each time period, the base station may determine, based on a receiving status of the location information, UEs that can report the location information of the UEs in the time period. Then, N UEs are selected from the UEs that can report the location information.

For example, the base station may randomly select the N UEs from the UEs that report the location information.

In one embodiment, the base station may further select, from the UEs that report the location information, N UEs that meet at least one condition of a condition A and a condition B. The condition A is a SINR is greater than or equal to a preset SINR threshold. The condition B is a DF is less than or equal to a preset DF threshold.

The condition A is used as an example. The base station may perform SINR measurement on the UEs that report the location information, and then select N UEs of which SINRs are greater than or equal to the SINR threshold. The N UEs may be any N UEs of which the SINRs are greater than or equal to the SINR threshold, or may be N UEs with top-ranked SINRs in UEs of which the SINRs are greater than or equal to the SINR threshold.

It should be noted that, within each time period, after the base station determines the N UEs, the base station may perform ToA measurement on one UE each time, to ensure that a ToA measurement value obtained through measurement each time is accurate and is not interfered by a signal of another UE. That is, after completing the ToA measurement on one UE and obtaining the ToA measurement value of the UE, the base station performs the ToA measurement on a next UE until the ToA measurement values of the N UEs are obtained.

It may be understood that if the location information reported by a UE within different time periods is different, that is, if the UE is in a moving state, the base station may perform ToA measurement on the UE for a plurality of times, to obtain a plurality of ToA measurement values. In this way, when a quantity of UEs that access the to-be-positioned RRU is limited, it is ensured that the base station can also obtain a sufficient quantity of ToA measurement values to perform RRU positioning. In other words, some UEs determined by the base station may be repeated within different time periods.

In each time period, after determining the N UEs, the base station may allocate an uplink resource to each UE, so that each UE sends an uplink signal on the allocated uplink resource. The base station sequentially receives the uplink signal from each UE on a corresponding uplink resource, measures a time period (that is, ToA) that the uplink signal takes to arrive at the to-be-positioned RRU, and determines a ToA measurement value based on the ToA obtained through measurement.

Figure 4:
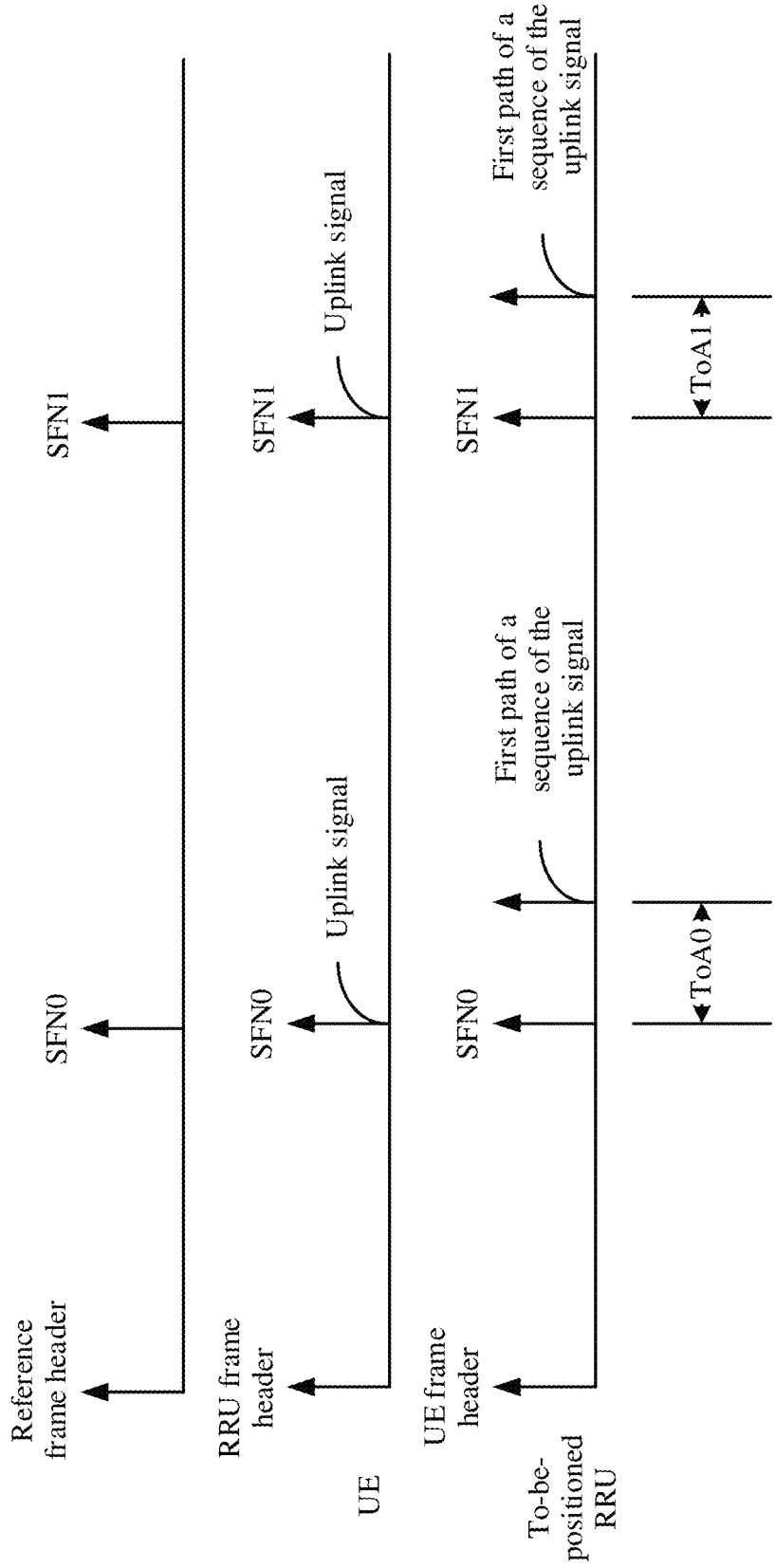
FIG. 4 is a schematic structural diagram of ToA measurement according to this application.

The ToA may be represented by a time offset of a reference frame header relative to a first path of a sequence of the uplink signal received by the base station. For example, as shown in FIG. 4, when a base station schedules, for UE, a frame of which a system frame number (SFN) is SNF0, the UE sends an uplink signal at SNF0 based on a standard frame format. A to-be-positioned RRU should also receive the uplink signal at SNF0 based on the standard frame format. Because it takes time for the uplink signal to propagate in a channel, the to-be-positioned RRU detects a location of the first path of the sequence of the uplink signal, which has a specific delay relative to a frame header SNF0, and the delay is ToA0 measured by the base station.

Figure 5:
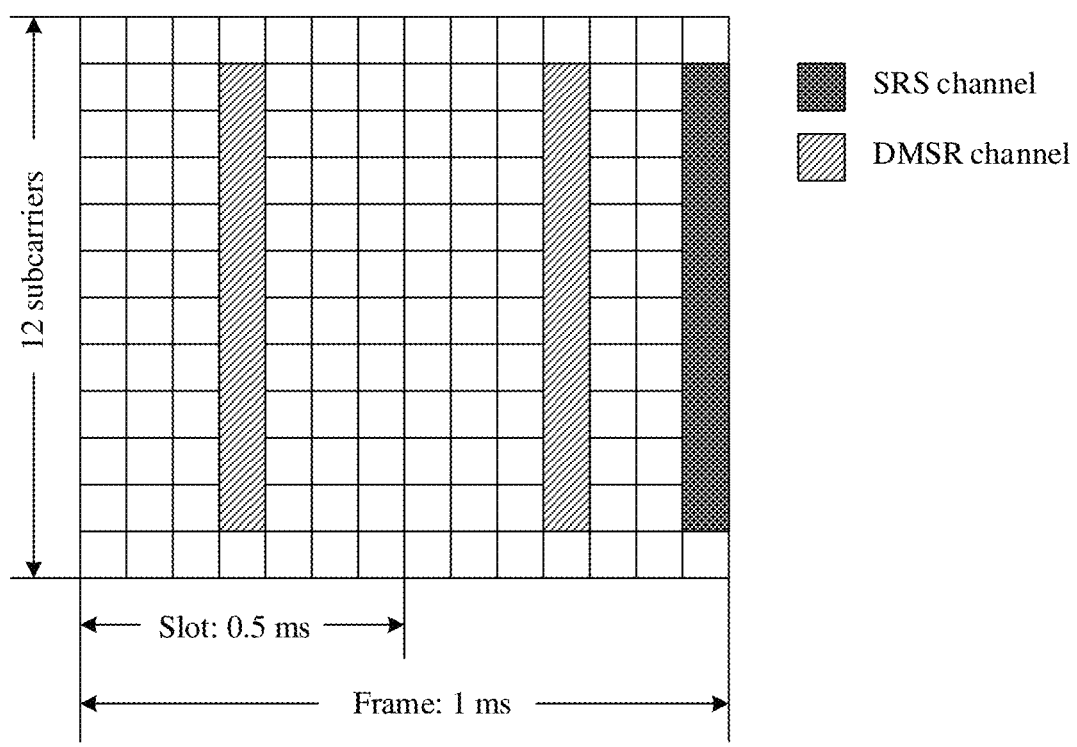
FIG. 5 is a schematic diagram of an SRS channel and a DMRS channel according to this application.

In one embodiment, the uplink signal may be an SRS signal or a DMRS signal. For example, FIG. 5 is a schematic diagram of an SRS channel and a DMRS channel. After a base station allocates a corresponding uplink resource to UE, the UE may send an uplink SRS signal or DMRS signal on the corresponding SRS channel or DMRS channel, so that the base station performs ToA detection based on the uplink SRS signal or DMRS signal.

In an example, the base station may schedule an uplink resource (for example, schedule a frame) for the UE, then detect ToA of the uplink signal sent by the UE in the frame, and directly use the ToA as a ToA measurement value obtained through current ToA measurement.

In one embodiment, to improve precision of the ToA measurement value, the base station may further perform the ToA measurement on multiple frames in an accumulation manner. For example, the base station may schedule a plurality of consecutive frames for the UE. Then, ToA of a plurality of uplink signals sent by the UE in the plurality of consecutive frames are measured, and an average value of the ToA of the plurality of uplink signals is calculated. The average value and a current timing advance TA of the UE are added, to obtain a ToA measurement value of the UE within the current time period.

Operation 303: The base station calculates a location of the to-be-positioned RRU based on the M ToA measurement values obtained within the at least one time period and M pieces of location information that are in the received location information and that respectively correspond to the M ToA measurement values.

For each ToA measurement value, location information corresponding to the ToA measurement value is: location information, in the location information reported by the UE of which the ToA measurement value is obtained by the base station by performing ToA measurement, of which reporting time is closest to time at which the base station performs the ToA measurement.

For example, before the UE sends at least one uplink signal in the current ToA measurement, the last piece of location information reported by the UE is location information corresponding to a ToA measurement value in the current ToA measurement. Alternatively, after the UE sends at least one uplink signal in the current ToA measurement, the first location information reported by the UE is location information corresponding to a ToA measurement value in the current ToA measurement.

In this application, one ToA measurement value and corresponding location information may be used as information about one sample point. After collecting information about M sample points, the base station may calculate location information of the to-be-positioned RRU based on the information about the M sample points.

It may be understood that, by using the method of determining a location of an RRU through positioning by using the location information of the UE and the ToA measurement value, a positioning module does not need to be added to the to-be-positioned RRU, and a hardware layout of the to-be-positioned RRU does not need to be changed, thereby avoiding increasing costs of the to-be-positioned RRU, and implementing positioning a large quantity of to-be-positioned RRUs on a live network.

In addition, regardless of a time division duplex (TDD) system or a frequency division duplex (FDD) system, the base station may enable the MDT function to indicate the UEs to periodically report the location information and perform ToA measurement on each UE. Therefore, according to the positioning method provided in this application, both an RRU in the TDD system and an RRU in the FDD system can be positioned.

In one embodiment, after the foregoing operation 303, the method may further include the following operations.

Operation 304: The base station sends the location of the to-be-positioned RRU to a network device.

After receiving the location of the to-be-positioned RRU from the base station, the network device may implement visualization of a physical location of the RRU and refined network coverage and network capacity evaluation by using the location of the RRU.

In an example, after obtaining the information about the M sample points, the base station also skips calculating the location of the to-be-positioned RRU. Instead, the base station sends the information about the M sample points (that is, M pieces of location information and the M ToA measurement values) to the network device. The network device calculates the location of the to-be-positioned RRU based on the information about the M sample points.

Figure 6:
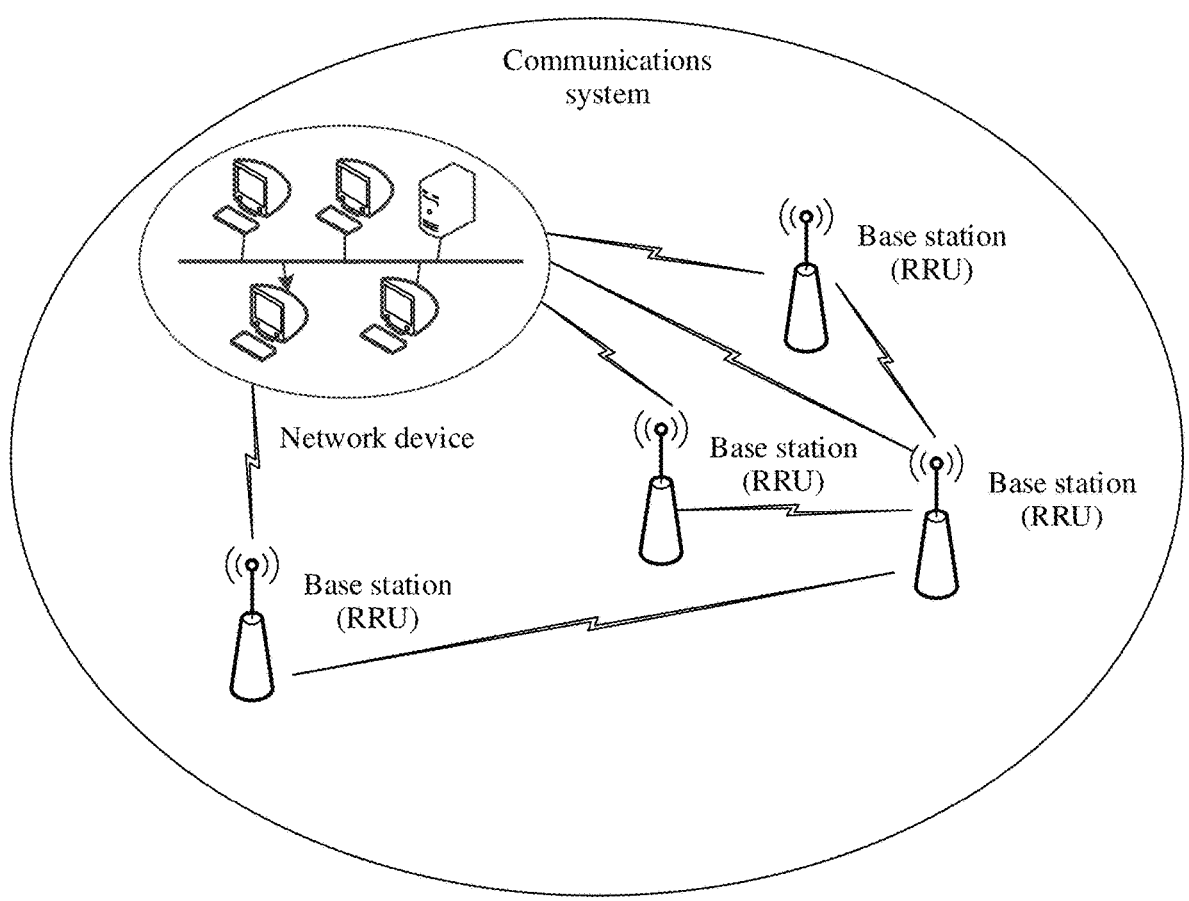
FIG. 6 is a schematic diagram 2 of a communications system according to this application.

In one embodiment, FIG. 6 is a schematic diagram of another communications system according to this application. The communications system includes a network device and a plurality of RRUs. When a location of an RRU is unknown, and locations of other RRUs are known, if the network device needs to position the to-be-positioned RRU, this application further provides another positioning method, and the another positioning method can implement positioning the RRU in an FDD system.

Figure 7:
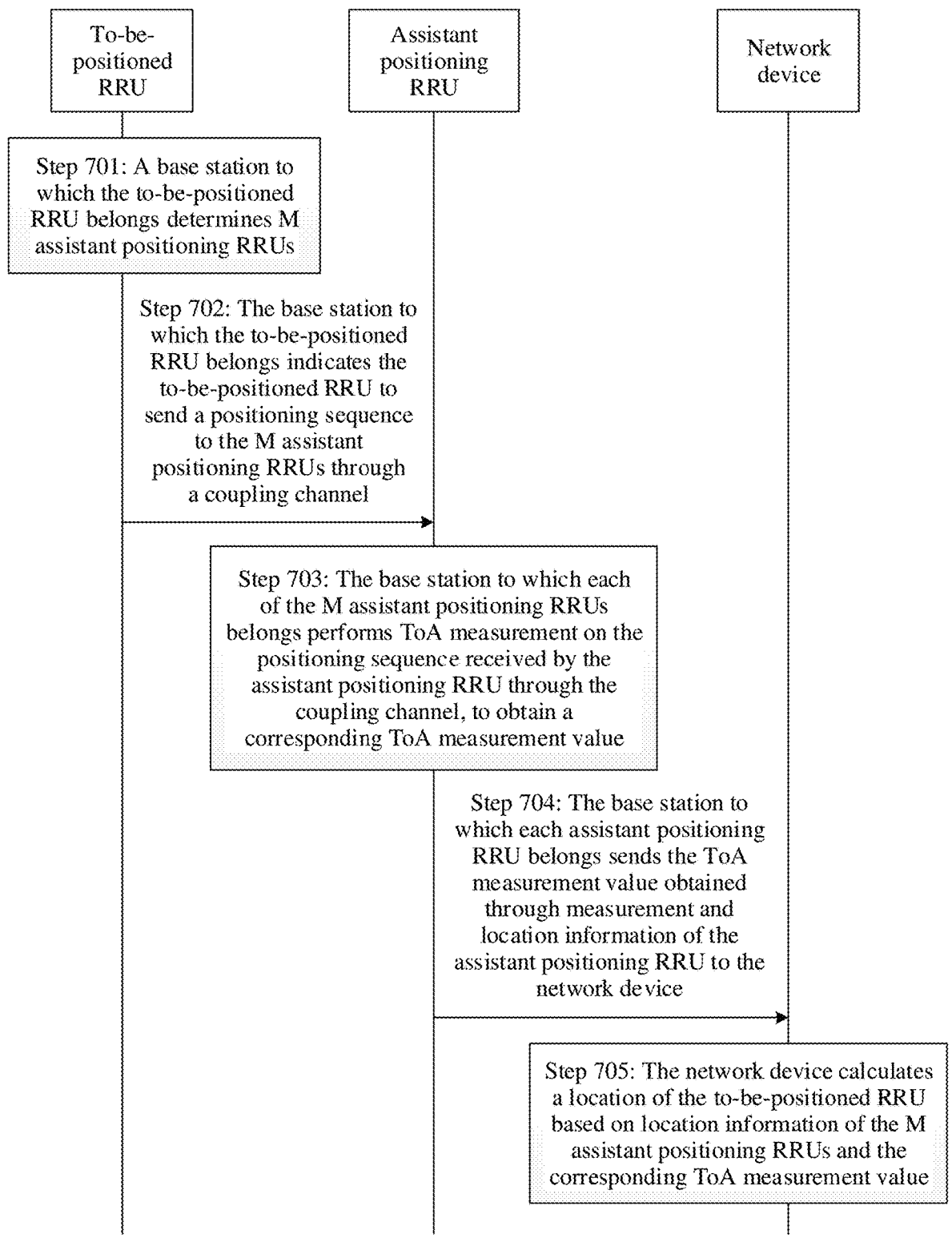
FIG. 7 is a flowchart 2 of an embodiment of a positioning method according to this application.

FIG. 7 is a flowchart of another embodiment of a positioning method according to this application. The method includes the following operations.

Operation 701: A base station to which a to-be-positioned RRU belongs determines M assistant positioning RRUs.

The M assistant positioning RRUs may be RRUs around the to-be-positioned RRU and of which locations are known.

The base station to which the to-be-positioned RRU belongs may learn of the M assistant positioning RRUs by using a message sent by a network device.

Operation 702: The base station to which the to-be-positioned RRU belongs indicates the to-be-positioned RRU to send a positioning sequence to the M assistant positioning RRUs through a coupling channel.

The base station may choose to indicate, within a time period (for example, at night) with a relatively low service volume, the to-be-positioned RRU to send the positioning sequence in a downlink subframe. Alternatively, the base station selects the M assistant positioning RRUs of which load is less than a preset threshold to send the positioning sequence.

Figure 8:
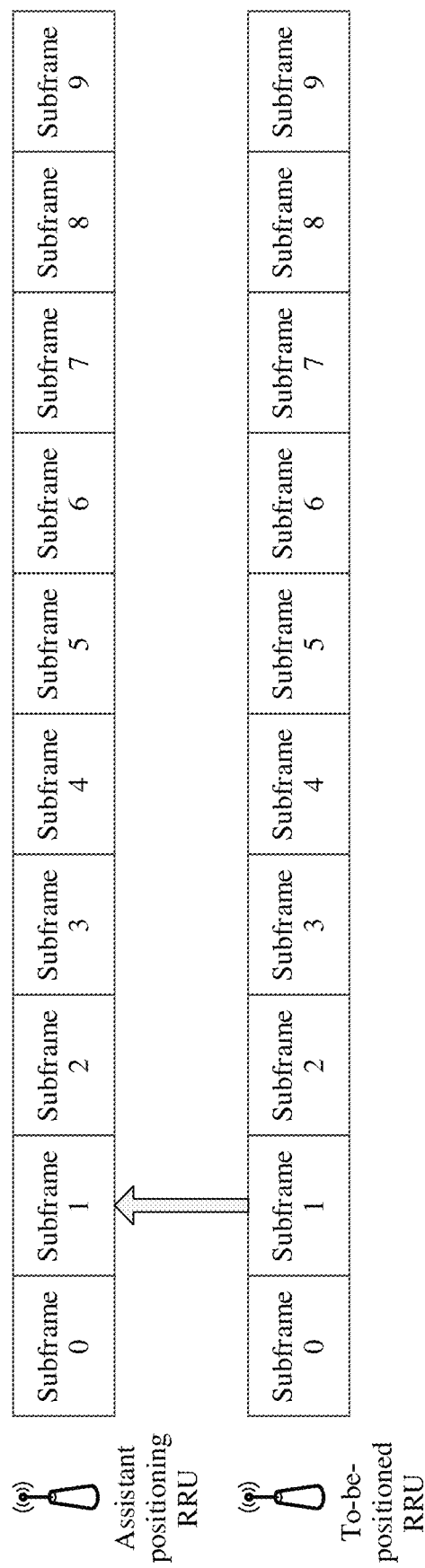
FIG. 8 is a schematic diagram of sending a positioning sequence according to this application.

For example, as shown in FIG. 8, subframes 0 to 9 are downlink subframes. In this case, the base station to which the to-be-positioned RRU belongs may select one downlink subframe, for example, a subframe 1, to stop data transmission. The base station stops scheduling on the subframe 1, and then indicates the to-be-positioned RRU to send the positioning sequence to the M assistant positioning RRUs on the subframe 1 through the coupling channel.

Figure 9:
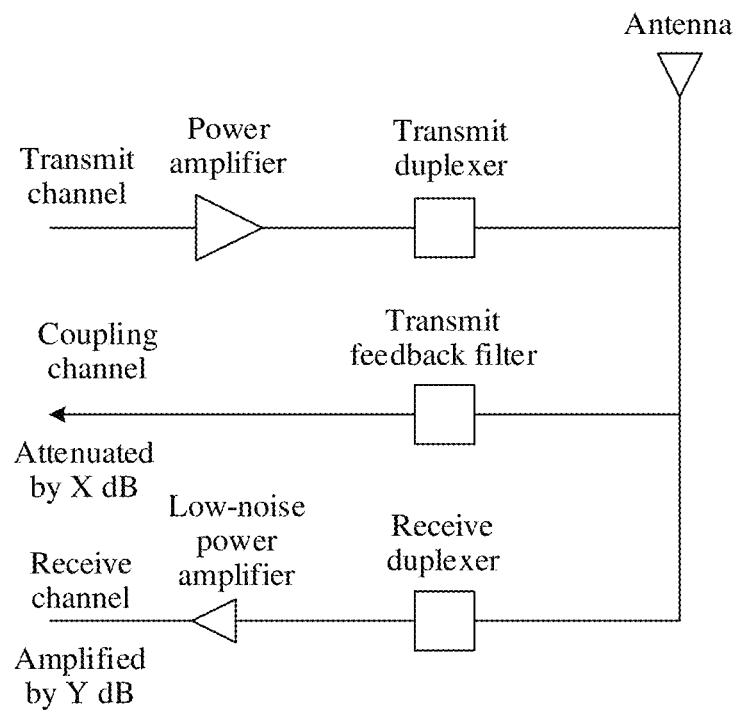
FIG. 9 is a schematic diagram of an internal structure of an RRU according to this application.

The coupling channel is a channel corresponding to a guard band between a transmit frequency band and a receive frequency band of each RRU in an FDD system. For example, FIG. 9 is a block diagram of an internal structure of an RRU in an FDD system. The RRU includes a receive channel (that is, a channel corresponding to a receive frequency band), a coupling channel, and a transmit channel (that is, a channel corresponding to a transmit frequency band). A power amplifier and a transmit duplexer are disposed on a transmit channel. After being processed by the power amplifier and the transmit duplexer, a signal is transmitted by using an antenna. The coupling channel includes a transmit feedback filter. A receive duplexer and a low noise power amplifier are disposed on the receive channel. After the antenna receives the signal, the signal is processed by the receive duplexer and the low noise power amplifier on the receive channel, and after the signal is amplified, the antenna inputs the signal to a corresponding BBU for further processing.

Due to a filter effect of the receive duplexer in the FDD system, the receive channel of the RRU cannot receive a signal from another RRU on the transmit channel. However, the coupling channel of the RRU is usually used for standing wave detection and channel calibration of an FDD antenna, and may receive the signal from another RRU. Therefore, a base station may indicate a to-be-positioned RRU to send a positioning sequence to M assistant positioning RRUs through the coupling channel, to ensure that the M assistant positioning RRUs can receive the positioning sequence of the to-be-positioned RRU through the coupling channel.

In this application, attenuation may be increased on the coupling channel, to avoid that an RRU component is burnt because the positioning sequence received by the assistant positioning RRU by using the coupling channel is excessively large.

Operation 703: A base station to which each of the M assistant positioning RRUs belongs performs ToA measurement on the positioning sequence received by the assistant positioning RRU through the coupling channel, to obtain a corresponding ToA measurement value.

In an example, the to-be-positioned RRU may send a positioning sequence to an assistant positioning RRU on a frame, so that the base station to which the assistant positioning RRU belongs may determine time period ToA that the detected positioning sequence takes to arrive at the assistant positioning RRU as a corresponding ToA measurement value.

In one embodiment, because the coupling channel attenuates a received signal to some extent, the base station to which the assistant positioning RRU belongs may also perform the ToA measurement on multiple frames in an accumulation manner, thereby improving precision of the ToA measurement value.

Specifically, the to-be-positioned RRU sends a plurality of positioning sequences to the assistant positioning RRU on a plurality of consecutive frames. Therefore, the base station to which the assistant positioning RRU belongs may measure ToA of a plurality of positioning sequences received by the assistant positioning RRU in a plurality of consecutive frames, and calculate an average value of the ToA of the plurality of positioning sequences, where the average value is the corresponding ToA measurement value.

Operation 704: The base station to which each assistant positioning RRU belongs sends the ToA measurement value obtained through measurement and location information of the assistant positioning RRU to a network device.

Operation 705: The network device calculates a location of the to-be-positioned RRU based on location information of the M assistant positioning RRUs and the corresponding ToA measurement value.

It may be understood that, in the example, when a communications system is the FDD system, the to-be-positioned RRU may send the positioning sequence to the assistant positioning RRU through the coupling channel, so that the base station to which each assistant positioning RRU belongs can obtain the corresponding ToA measurement value through measurement. Therefore, the network device can calculate the location of the to-be-positioned RRU based on the ToA measurement value sent by the base station to which each assistant positioning RRU belongs and location information of each assistant positioning RRU. In this way, the to-be-positioned RRU in the FDD system is positioned. By using the method of determining the location of the to-be-positioned RRU through positioning by using the location information of the assistant positioning RRU and the ToA measurement value, a positioning module does not need to be added to the to-be-positioned RRU, and a hardware layout of the to-be-positioned RRU does not need to be changed, thereby avoiding increasing costs of the to-be-positioned RRU, and implementing positioning a large quantity of to-be-positioned RRUs on the live network.

The solutions provided in this application are described above mainly from a perspective of interaction between network elements. It may be understood that, to implement the foregoing functions, each network element, for example, the base station, includes a corresponding hardware structure and/or software module for performing the functions. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the embodiment goes beyond the scope of this application.

In this application, function modules in the base station may be obtained through division based on the foregoing method examples. For example, the function modules may be obtained through division in correspondence with functions, or two or more functions may be integrated into one processing module. The integrated module may be implemented in a form of hardware, or may be implemented in a form of a software function module. It should be noted that, in this application, module division is exemplary, and is merely a logical function division. In some embodiments, another division manner may be used.

Figure 10A:
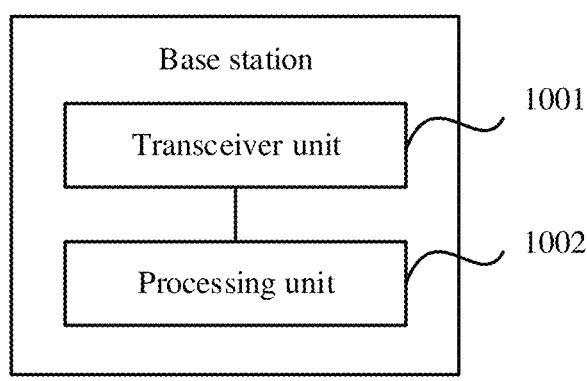
FIG. 10A is a schematic structural diagram 2 of a base station according to this application.

When the function modules are obtained through division in correspondence with the functions, FIG. 10A is an example schematic structural diagram of the base station in the foregoing embodiment. The base station includes a transceiver unit 1001 and a processing unit 1002. When the base station is used as a base station to which a to-be-positioned RRU belongs, the transceiver unit 1001 is configured to support the base station in performing operations 301 and 304 in FIG. 3 and operation 702 in FIG. 7; and the processing unit 1002 is configured to support the base station in performing operations 302 and 303 in FIG. 3 and operation 701 in FIG. 7. When the base station is used as a base station to which an assistant positioning RRU belongs, the transceiver unit 1001 is configured to support the base station in performing operations 702 and 704 in FIG. 7; and the processing unit 1002 is configured to support the base station in performing operation 703 in FIG. 7. All related content of the operations in the foregoing method embodiment may be cited in function descriptions of corresponding function modules. Details are not described herein again.

Figure 10B:
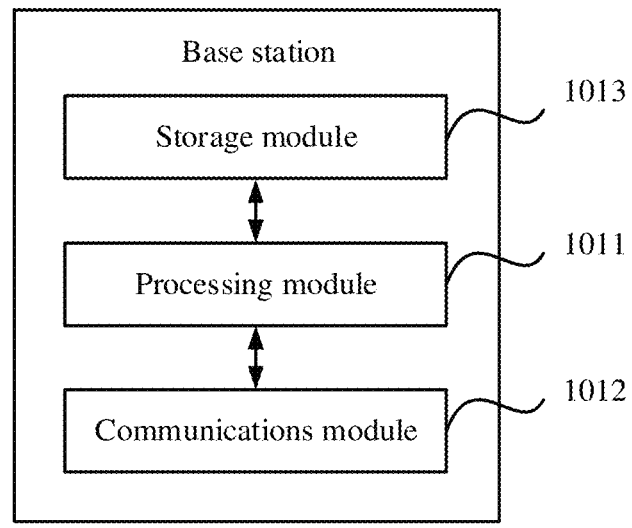
FIG. 10B is a schematic structural diagram 3 of a base station according to this application.

When an integrated unit is used, FIG. 10B is an example schematic structural diagram of the base station in the foregoing embodiment. The base station includes a processing module 1011 and a communications module 1012. The processing module 1011 is configured to control and manage an action of the base station. For example, when the base station is used as a base station to which a to-be-positioned RRU belongs, the processing module 1011 is configured to support the base station in performing operations 301 to 304 in FIG. 3 and operations 701 and 702 in FIG. 7, and/or is configured in another process of the technology described in this specification. The communications module 1012 is configured to support communication between the base station and another network entity. When the base station is used as a base station to which the assistant positioning RRU belongs, the processing module 1011 is configured to support the base station in performing operations 702 and 703 in FIG. 7, and/or is configured in another process of the technology described in this specification. The communications module 1012 is configured to support communication between the base station and another network entity. The base station may further include a storage module 1013, configured to store program code and data of the base station.

The processing module 1011 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 1012 may be a transceiver, a transceiver circuit, a communications interface, or the like. The storage module 1013 may be a memory.

Figure 10C:
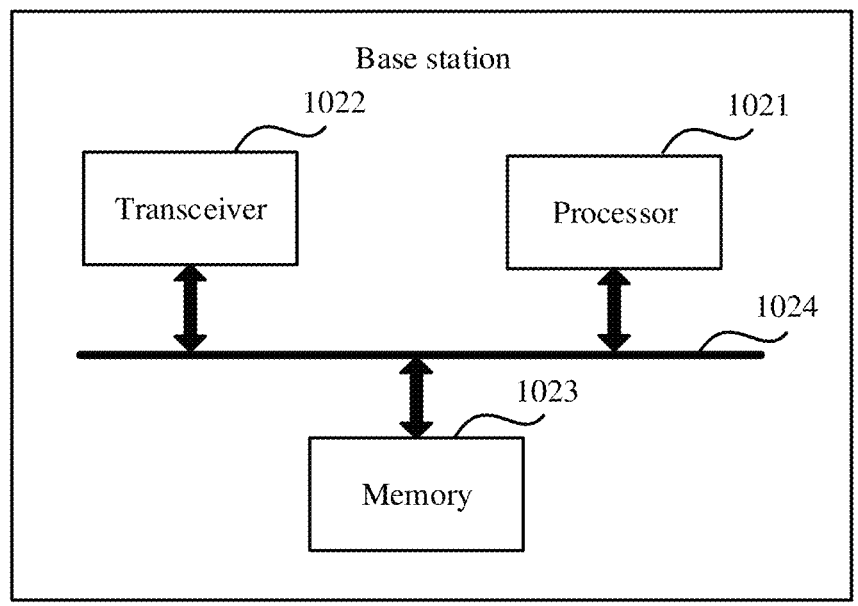
FIG. 10C is a schematic structural diagram 4 of a base station according to this application.

When the processing module 1011 is a processor, the communications module 1012 is a transceiver, and the storage module 1013 is a memory, the base station in this application may be a base station shown in FIG. 10C.

Referring to FIG. 10C, the base station includes a processor 1021, a transceiver 1022, a memory 1023, and a bus 1024. The transceiver 1022, the processor 1021, and the memory 1023 are connected to each other by using the bus 1024. The bus 1024 may be a peripheral component interconnect (PCI) standard bus, an extended industry standard architecture (EISA) bus, or the like. The bus may be classified into an address bus, a data bus, a control bus, and the like. For ease of representation, only one thick line is used to represent the bus in FIG. 10C, but this does not mean that there is only one bus or only one type of bus.

This application further provides a communications apparatus, including units or means configured to perform the operations performed by the foregoing base station and/or centralized control apparatus. The communications apparatus may be a chip. In one embodiment, this application further provides a computer storage medium, where the computer storage medium may store a program, and when the program is executed, some or all of the operations of the embodiments of the positioning method provided in this application may be performed. The storage medium may be a magnetic disk, an optical disc, a read-only memory (ROM), a random access memory (RAM), or the like.

This application further provides a computer program product that includes an instruction, and when the computer program product is run on a computer, the computer is enabled to perform some or all of the operations in the embodiments of the positioning method provided in this application.

A person skilled in the art may clearly understand that, the technologies in the embodiments of this application may be implemented by software in addition to a necessary general hardware platform. Based on such an understanding, the technical solutions of this application essentially or the part contributing to the prior art may be implemented in a form of a software product. The software product is stored in a storage medium, such as a ROM/RAM, a magnetic disk, an optical disc and the like, and includes several instructions for indicating a computer device (which may be a personal computer, a server, or a network device and the like) to perform the methods described in the embodiments or some parts of the embodiments of this application.

For same or similar parts in the embodiments in this specification, refer to each other. Especially, the embodiment of the centralized control apparatus is basically similar to a method embodiment, and therefore is described briefly. For related parts, refer to descriptions in the method embodiment.

The foregoing descriptions are implementation manners of this application, but are not intended to limit the protection scope of this application.

What is claimed is:

1. A positioning method, comprising:
    sending, by a base station, indication information to a plurality of user equipment (UEs), wherein the plurality of UEs have a minimization of drive-test (MDT) function in a cell covered by a to-be-positioned remote radio unit (RRU), and the indication information is used to indicate the plurality of UEs to periodically report location information;
    obtaining, by the base station within each of at least one time period, time-of-arrival (ToA) measurement values of N UEs, wherein the N UEs are some UEs that report the location information in the plurality of UEs, N≥1, and N is an integer; and
    calculating, by the base station, a location of the to-be-positioned RRU based on M ToA measurement values obtained within the at least one time period and M pieces of location information that are in the received location information and that respectively correspond to the M ToA measurement values, wherein M≥3, and M is an integer.

2. The method according to claim 1, wherein the N UEs meet at least one condition of a condition A and a condition B;
    the condition A is a signal to interference plus noise ratio (SINR) and is greater than or equal to a preset SINR threshold; and
    the condition B is a Doppler frequency (DF) and is less than or equal to a preset DF threshold.

3. The method according to claim 1, wherein a manner in which the base station obtains a ToA measurement value of each of the N UEs is:
    measuring, by the base station, ToA of a plurality of uplink signals sent by the UE in a plurality of consecutive frames, wherein ToA of each uplink signal is a time period that the uplink signal takes to arrive at the to-be-positioned RRU;
    calculating, by the base station, an average value of the ToA of the plurality of uplink signals; and
    adding, by the base station, the average value and a current timing advance TA of the UE, to obtain the ToA measurement value of the UE.

4. The method according to claim 1, wherein for each of the M ToA measurement values, location information corresponding to the ToA measurement value is:
    location information, in the location information reported by the UE of which the ToA measurement value is obtained by the base station by performing ToA measurement, of which reporting time is closest to time at which the base station performs the ToA measurement.

5. The method according to claim 1, wherein the method further comprises:
    sending, by the base station, the location of the to-be-positioned RRU to a network device.

6. An apparatus, comprising:
    a memory, the memory configured to store a computer program instruction; and
    at least one processor, the at least one processor configured to execute the computer program instruction stored in the memory to perform the following operations:
    sending, indication information to a plurality of UEs, wherein the plurality of user equipment (UEs) have a minimization of drive-test (MDT) function in a cell covered by a to-be-positioned remote radio unit (RRU), and the indication information is used to indicate the plurality of UEs to periodically report location information;
    obtaining, within each of at least one time period, time-of-arrival (ToA) measurement values of N UEs, wherein the N UEs are some UEs that report the location information in the plurality of UEs, N≥1, and N is an integer; and
    calculating, a location of the to-be-positioned RRU based on M ToA measurement values obtained within the at least one time period and M pieces of location information that are in the location information received by the apparatus and that respectively correspond to the M ToA measurement values, wherein M≥3, and M is an integer.

7. The apparatus according to claim 6, wherein the N UEs meet at least one condition of a condition A and a condition B;
    the condition A is a signal to interference plus noise ratio (SINR) and is greater than or equal to a preset SINR threshold; and
    the condition B is a Doppler frequency (DF) and is less than or equal to a preset DF threshold.

8. The apparatus according to claim 6, wherein the at least one processor is further configured to perform the following operations:
    measuring ToA of a plurality of uplink signals sent by the UE in a plurality of consecutive frames, wherein ToA of each uplink signal is a time period that the uplink signal takes to arrive at the to-be-positioned RRU;
    calculating an average value of the ToA of the plurality of uplink signals; and
    adding the average value and a current timing advance TA of the UE, to obtain the ToA measurement value of the UE.

9. The apparatus according to claim 6, wherein for each of the M ToA measurement values, location information corresponding to the ToA measurement value is:
location information, in the location information reported by the UE of which the ToA measurement value is obtained by the at least one processor by performing ToA measurement, of which reporting time is closest to time at which a base station performs the ToA measurement.

10. The apparatus according to claim 6, wherein the at least one processor is further configured to perform the following operation:
sending the location of the to-be-positioned RRU to a network device.

11. A non-transitory computer-readable storage medium, comprising an instruction, wherein when the instruction is run on a computer, the computer is enabled to perform the following operations: sending, indication information to a plurality of UEs, wherein the plurality of user equipment (UEs) have a minimization of drive-test (MDT) function in a cell covered by a to-be-positioned remote radio unit (RRU), and the indication information is used to indicate the plurality of UEs to periodically report location information; obtaining, within each of at least one time period, time-of-arrival (ToA) measurement values of N UEs, wherein the N UEs are some UEs that report the location information in the plurality of UEs, N>1, and N is an integer; and calculating, a location of the to-be-positioned RRU based on M ToA measurement values obtained within the at least one time period and M pieces of location information that are in the location information received by the apparatus and that respectively correspond to the M ToA measurement values, wherein M>3, and M is an integer.

12. The computer-readable storage medium according to claim 11, wherein the N UEs meet at least one condition of a condition A and a condition B;
the condition A is a signal to interference plus noise ratio (SINR) and is greater than or equal to a preset SINR threshold; and
the condition B is a Doppler frequency (DF) and is less than or equal to a preset DF threshold.

13. The computer-readable storage medium according to claim 11, wherein the computer is enabled to perform the following operations:
measuring ToA of a plurality of uplink signals sent by the UE in a plurality of consecutive frames, wherein ToA of each uplink signal is a time period that the uplink signal takes to arrive at the to-be-positioned RRU;
calculating an average value of the ToA of the plurality of uplink signals; and
adding the average value and a current timing advance TA of the UE, to obtain the ToA measurement value of the UE.

14. The computer-readable storage medium according to claim 11, wherein for each of the M ToA measurement values, location information corresponding to the ToA measurement value is:
location information, in the location information reported by the UE of which the ToA measurement value is obtained by the at least one processor by performing ToA measurement, of which reporting time is closest to time at which a base station performs the ToA measurement.

15. The computer-readable storage medium according to claim 11, wherein the computer is enabled to perform the following operation:
sending the location of the to-be-positioned RRU to a network device.

* * * * *

UNITED STATES PATENT AND TRADEMARK OFFICE
CERTIFICATE OF CORRECTION

PATENT NO. : 11,412,474 B2
APPLICATION NO. : 17/014098
DATED : August 9, 2022
INVENTOR(S) : Wei Dong et al.

Page 1 of 1

It is certified that error appears in the above-identified patent and that said Letters Patent is hereby corrected as shown below:

In the Claims

In Claim 11, Column 17, Line 26, delete "N>1" and insert --N≥1--.

In Claim 11, Column 17, Line 32, delete "M>3" and insert --M≥3--.

Signed and Sealed this
Eighth Day of November, 2022

Katherine Kelly Vidal
*Director of the United States Patent and Trademark Office*